United States Patent [19]

Attinger et al.

[11] Patent Number: 5,078,224
[45] Date of Patent: Jan. 7, 1992

[54] RADIATOR MOUNTING FOR MOTOR VEHICLES

[75] Inventors: Thomas Attinger; Ingo Oses, both of Stuttgart, Fed. Rep. of Germany

[73] Assignee: Mercedes-Benz AG, Fed. Rep. of Germany

[21] Appl. No.: 559,080

[22] Filed: Jul. 30, 1990

[30] Foreign Application Priority Data

Aug. 11, 1989 [DE] Fed. Rep. of Germany ....... 3926568

[51] Int. Cl.5 ............................................. B60K 11/04
[52] U.S. Cl. .................................... 180/68.4; 248/635; 165/67
[58] Field of Search .................... 180/68.4, 300, 312; 165/67; 248/232, 233, 635

[56] References Cited

U.S. PATENT DOCUMENTS

| Re. 17,146 | 11/1928 | Gurney | 180/68.4 X |
|---|---|---|---|
| 3,788,419 | 1/1974 | Drone et al. | 180/68.4 |
| 3,970,164 | 7/1976 | Suzuki | 180/68.4 |
| 4,519,467 | 5/1985 | Saunders | 180/68.4 |
| 4,651,839 | 3/1987 | Isobe | 180/68.4 |
| 4,783,039 | 11/1988 | Peterson et al. | 248/635 |
| 4,821,828 | 4/1989 | Schwerzler et al. | 180/68.4 |

FOREIGN PATENT DOCUMENTS

| 1456558 | 11/1976 | European Pat. Off. . | |
|---|---|---|---|
| 0126855 | 2/1984 | European Pat. Off. . | |
| 448266 | 8/1927 | Italy | 180/68.4 |
| 353058 | 7/1931 | United Kingdom | 180/68.4 |
| 580918 | 1/1946 | United Kingdom | 248/635 |
| 1031680 | 6/1966 | United Kingdom . | |

Primary Examiner—Robert P. Olszewski
Assistant Examiner—Brian L. Johnson
Attorney, Agent, or Firm—Evenson, Wands, Edwards, Lenahan & McKeown

[57] ABSTRACT

The invention relates to a radiator mounting for motor vehicles, in which the radiator rests against a respective corresponding support fixed to a vehicle by at least one bearing support fixed to the radiator. The radiator is supported elastically and adjustably via at least one further bearing fixed to the vehicle. The bearing fixed to the radiator consists of a hollow mounting pin which can be inserted into an opening of the bearing fixed to the vehicle and receives a mounting element which bears a compensating plate held such that its position can be varied relative to said element.

14 Claims, 2 Drawing Sheets

RADIATOR MOUNTING FOR MOTOR VEHICLES

BACKGROUND AND SUMMARY OF THE INVENTION

The invention relates to a radiator mounting for motor vehicles, in which the radiator rests by means of at least one support fixed to the radiator against a respective corresponding support fixed to the vehicle, and in which the radiator is supported adjustably, via at least one further bearing fixed to the radiator, on a corresponding bearing fixed to the vehicle which receives the radiator elastically.

A radiator mounting is know from EPO 0,126,855 in which the radiator is received between elastic bearings supported on the mounting side, at least one of these bearings being adjustable by means of a screw and in this way bracing the radiator against the support fixed to the vehicle. The result is both that the radiator is held and that manufacturing and fitting tolerances of the mounting and radiator are compensated.

A disadvantage of this mounting consists that in order to dismantle the radiator the bearings must be brought from their operating position into their non-operating position. During renewed fitting of the radiator, the bearings are once again brought into their operating position, the tolerance compensation having, in turn, to be carried out. A further disadvantage of the mounting is to be seen in the fact that the adjustable bearings must be held on the mounting side via a welding nut, which is bound up with increased manufacturing expenditure and must be secured in an expensive way in its adjustment position via a further nut. Moreover, owing to carelessly done adjustment of the tolerance compensation, the radiator can be too rigidly clamped and thereby also damaged because of the light-metal construction customary today.

It is therefore an object of the invention to configure a radiator mounting of the type according to the preamble in such a way that the radiator can be dismantled and fitted, even repeatedly, without renewed adjustment of the tolerance compensation being done, and can be held free from strain.

This object is achieved according to the invention by providing an arrangement wherein the bearing fixed to the radiator consists of a hollow mounting pin which can be inserted into an opening of the bearing fixed to the vehicle and receives a mounting element, which mounting element bears a compensating plate held such that its position can be varied relative to the mounting element.

A radiator for a motor vehicle rests, by means of at least one support fixed to the radiator, against a respective corresponding support fixed to the vehicle. On the upper side of the radiator, the radiator housing bears a hollow mounting pin, into which a mounting element is inserted. This mounting element is supported at one of its ends on the mounting pin, and carries at its other end a compensating plate, which is held such that its position can be varied relative to the mounting element. In the fitted state, the mounting pin is inserted into an opening of the bearing fixed to the vehicle, and thereby secures the radiator against tilting. By varying the position of the compensating plate on the mounting element, the parts of the compensating plate projecting outwards through openings in the mounting pin are brought to bear against the bearing fixed to the vehicle, into which bearing the bearing fixed to the radiator is introduced. Support on the mounting pin, and consequently on the radiator itself, is done via the other end of the mounting element. In this way, the radiator is secured in the vertical direction, with tolerance compensation carried out. Dismantling of the radiator is done by removing the bearing fixed to the vehicle from the bearing fixed to the radiator. An adjustment of the compensating plate on the mounting element is not necessary. In this way, the radiator can subsequently once again be fitted by bringing the bearing fixed to the vehicle over the bearing fixed to the radiator, without a renewed adjustment of the compensating plate on the mounting element being necessary for tolerance compensation. Securing the position of the compensating plate is done owing to the fact that the mounting element is connected via securing means to the mounting pin.

Other objects, advantages and novel features of the present invention will become apparent from the following detailed description of the invention when considered in conjunction with the accompanying drawings.

DETAILED DESCRIPTION OF THE DRAWINGS

Figure 1:
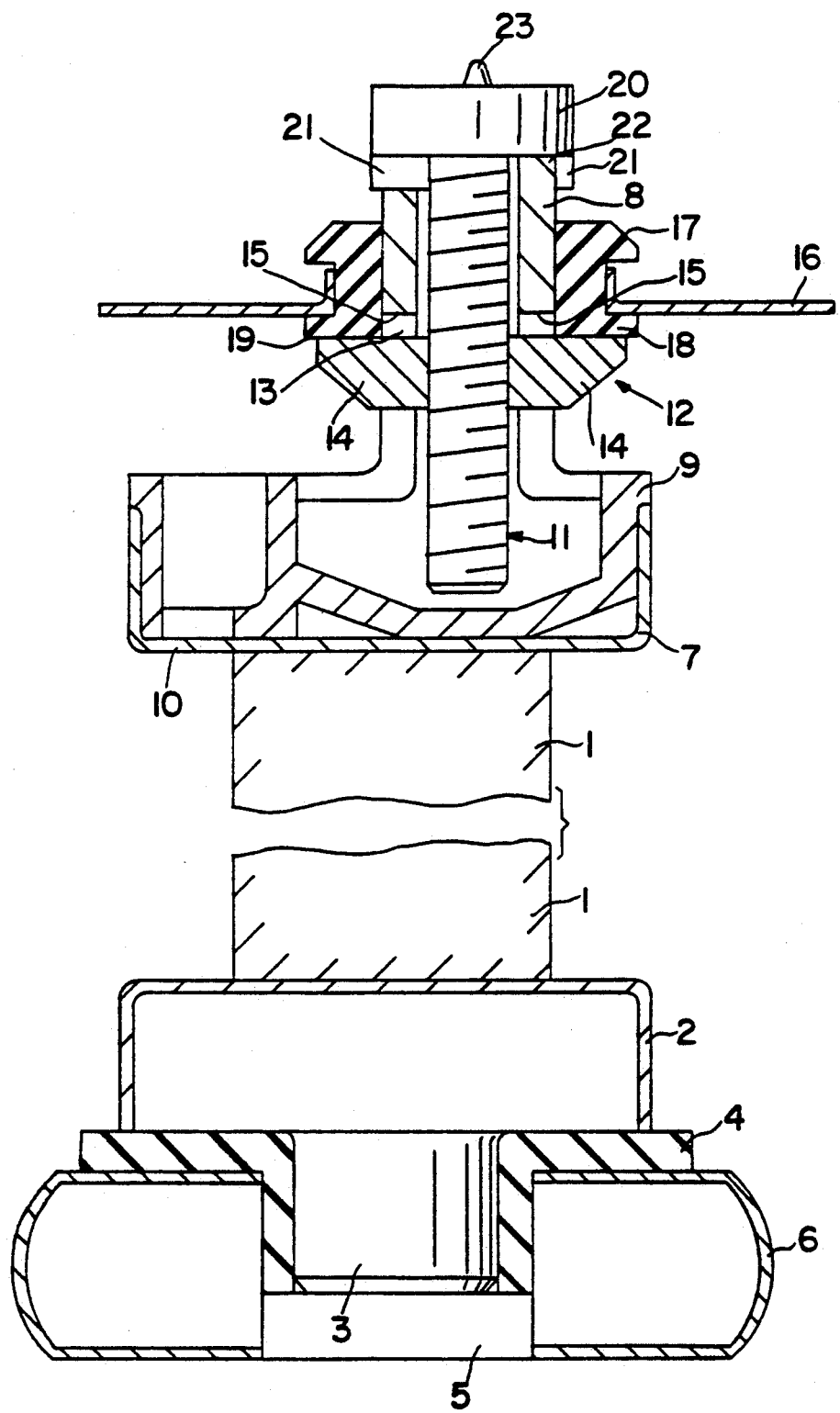
FIG. 1 is a schematic sectional view of a radiator mounting constructed according to a preferred embodiment of the invention.

FIG. 1 shows in cross-section a radiator mounting of the type according to the invention having a radiator 1, which for the sake of simplicity is not represented in its entire length. At its lower end, the radiator 1 has a radiator receptor 2, into which a lower mounting pin 3 is inserted. With this mounting pin 3, the radiator 1 is inserted into a rubber bushing 4, which in turn is arranged in a bore 5 of a lower radiator cross arm 6 fixed to the vehicle. The radiator 1 is supported in this way on the vehicle (not represented here).

The upper end of the radiator 1 consists of an upper radiator receptor 7, which receives a holder 9 provided with a hollow mounting pin 8. The radiator receptor 7 and holder 9 can contain for example, a bore 10, into which a condenser of an air conditioner can be inserted, if required. Inserted into the hollow mounting pin 8 is a mounting element constructed as a screw 11, onto the thread of which a compensating plate 12 provided with a corresponding counter-thread is screwed, and is held such that its position relative to the screw 11 can be varied via the thread by twisting the screw 11. For this purpose, window-like openings 13 are provided in the lower part of the mounting pin 8, through which the limbs 14 of the compensating plate 12 extend. These windows 13 facilitate the vertical displacement of the compensating plate 12 from a position located at the lower end of the screw 11 into an upper position which is bounded by the mounting pin 8 with its stop surfaces 15.

To fit the radiator 1 into a motor vehicle, the radiator is inserted with its lower mounting pin 3 into the rubber bushing 4 of the radiator cross arm 6. Subsequently, a radiator bridge 16 which can be, e.g., screwed to the vehicle is guided over the upper radiator bearing, i.e. over the mounting pin 8, to be precise in such a way that the rubber bushing 17 inserted into an opening of the radiator bridge 16 bears against the mounting pin 8, and consequently prevents the radiator 1 from tilting.

Both the rubber bushing 4 of the lower radiator bearing, and the rubber bushing 17 of the upper radiator bearing can be provided for the purpose of receiving the respective mounting pins 3 and 8 with a round opening or, by contrast, with a longitudinally configured opening which allows compensation of possible manufacturing of fitting tolerances in the transverse direction of the radiator 1. During this fitting, the screw 11 is twisted such that the compensating plate 12 attached to it is brought into a lower position on the screw 11. When the radiator bridge 16 is pushed over the mounting pin 8 and mounted on the vehicle side, e.g. via a screw connection (not shown), the screw 11 is twisted such that the compensating plate 12 passes via its thread connection to the screw 11, into an upper position, in which it bears with its upper surface 18 against the lower surface 19 of the rubber bushing 17. In this case, the radiator 1 is supported via its mounting pin 8, the screw head 20, the screw 11 and the compensating plate 12 on the rubber bushing 17, and consequently on the radiator bridge 16. A vertical movement of the radiator bridge 16. A vertical movement of the radiator 1 is thus prevented in the fitted state, and there is at the same time a compensation of possible vertical manufacturing or fitting tolerances. By means of a grip strip or for 23 provided on the top side of the screw head 20, the screw 11 can be tightened in a simple fashion by hand without the use of a tool, and thus the radiator can be mounted. The side of the screw head 20 that is in contact with the mounting pin 8 is provided with teeth 21, which engage in a saw tooth-shaped set of teeth 22 running around the upper edge of the mounting pin 8. In this way, the screw 11 is secured against unintentional detachment, e.g. by vibration during driving.

Figure 2:
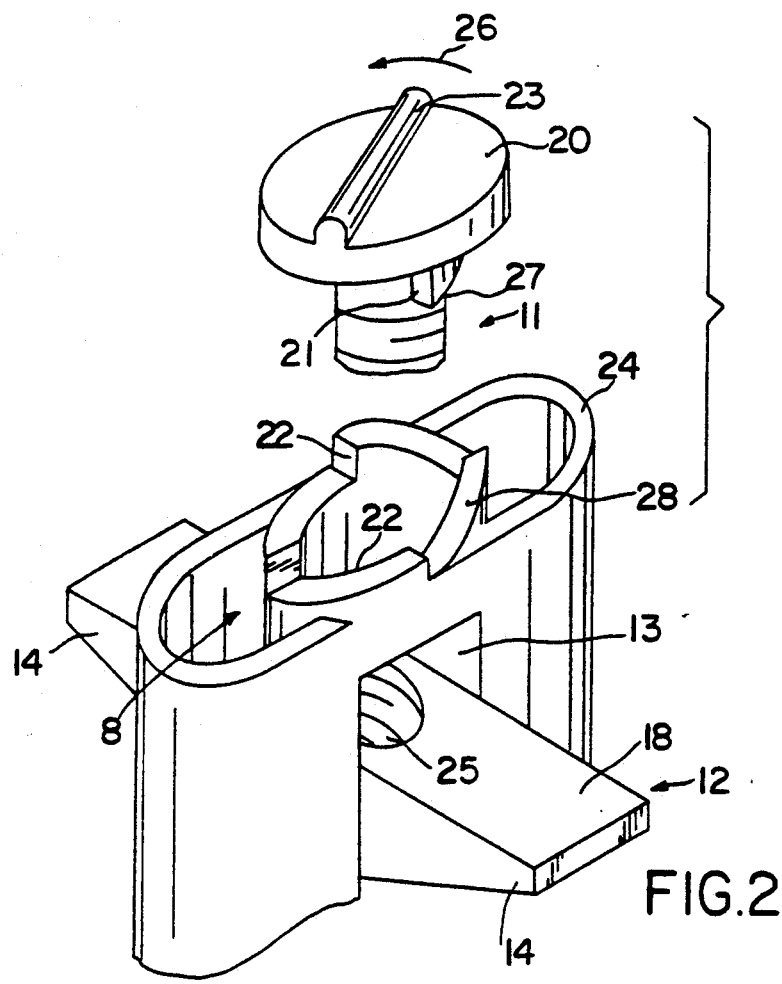
FIG. 2 is a perspective partly exploded view which shows a part of the radiator mounting according to the invention.

The mode of operation of this fixture is described with reference to FIG. 2, which shows a part of the radiator mounting according to the invention in a perspective view. The parts represented in FIG. 2 and corresponding to those shown in FIG. 1 are provided with the same reference numerals. For the sake of clarity, the radiator bridge with its rubber bushing is not shown in this figure. Once again 8 denotes a hollow mounting pin attached to the holder (not shown) of the radiator, which pin has in this illustrative embodiment an external part 24, which is shaped to enlarge the contact area on the rubber bushing (not shown). The screw 11, shown cut off at its lower end, reaches through the bore in the mounting pin 8 into a bore 25, having a counter-thread matching the screw thread, of the compensating plate 12, which has two limbs 14 reaching through the window openings 13 of the mounting pin 8. Upon twisting of the screw 11, e.g. by hand via the grip bar 23 provided on the screw head 20, in the direction of the arrow 26, the inclined surfaces 27 of the teeth 21 provided on the underside of the screw head 20 slide on the inclined surfaces 28 of the set of teeth 22 provided on the top side of the mounting pin 8.

Upon twisting, the compensating plate 12 is moved upwards, until it bears with its upper surface 18 against the lower surface of the rubber bushing (not represented) and in this way secures the radiator against vertical movements. Upon stronger tightening of the screw 11, and thus with a stronger pressure exerted by the compensating plate 12 on the rubber bushing the force exerted on the radiator 1 increases. Too strong a tightening of the screw 11, and possible damage resulting therefrom to the radiator due to compression, normally produced in a light-weight construction, can be prevented by the dimensioning of the screw head 20 and of the grip strip 23, by dimensioning them precisely such that a specific moment to be applied by hand on the screw 11 cannot be exceeded. With each twisting of the screw 11 by a specific angular amount dependent upon the set of teeth 22, the teeth 21 of the screw head snap into the set of teeth 22 of the mounting pin 8, and thus secure the screw against unintentional detachment. The force acting on the radiator can be adjusted in appropriate steps via a corresponding dimensioning of the pitch of the set of teeth 22 or of the teeth 21.

In another embodiment (not shown here) of the invention, it is also conceivable that the number of teeth on the screw head 20 and on the mounting pin 8 is not limited to a specific number, but that a plurality of small teeth with a thereby consequently smaller tooth height is provided in the form of a fine notching.

Figure 3:
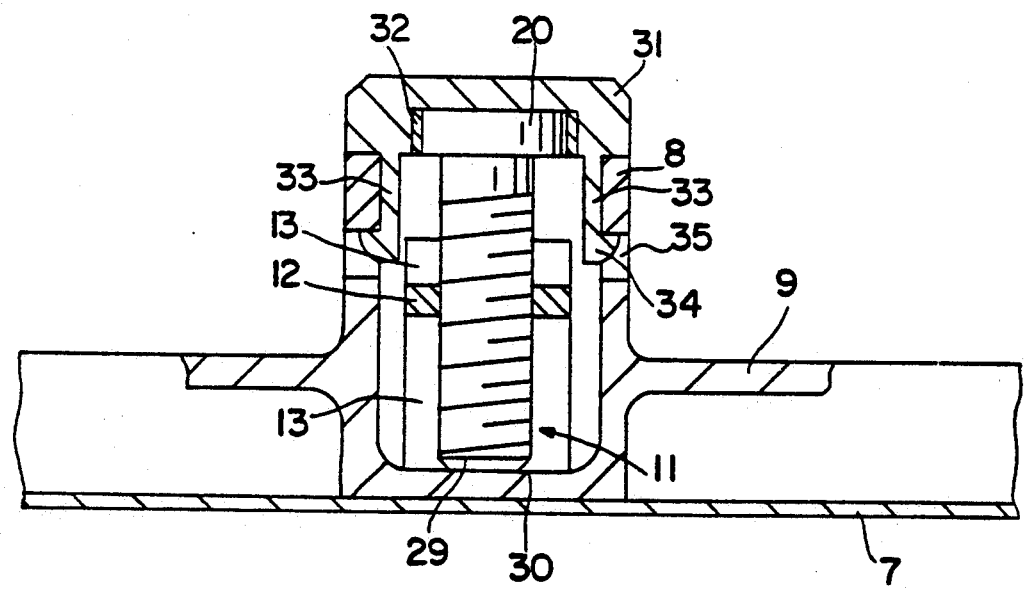
FIG. 3 is a schematic longitudinal sectional view which shows a second illustrative embodiment of a radiator mounting according to the invention.

A second illustrative embodiment in accordance with the invention follows from FIG. 3. The radiator mounting is shown here in a longitudinal section, the same parts also having the same reference numerals as in the above figures. For the sake of clear representation, the radiator bridge and the rubber bushing inserted therein are not shown in this illustrative embodiment either. Inserted into the radiator receptor 7 is the holder 9, which has the hollow mounting pin 8. Inserted in this mounting pin in the fashion described is the screw 11, to which the compensating plate 12, which has a corresponding counter-thread, is movably connected. Owing to twisting of the screw 11, this compensating plate 12 is displaced in the vertical direction along the screw 11 inside the window opening 13 of the mounting pin 8 and, as described above, secures the radiator against vertical movements by bracing the radiator (not shown) against the radiator bridge fixed to the vehicle. By contrast with the previously described illustrative embodiments, the diameter of the head 20 of the screw 11 is smaller than the internal diameter of the hollow mounting pin 8. Since, because of the smaller head diameter, the screw can no longer be supported on the upper edge of the mounting pin 8, this support is effected here via the screw end 29 on the bottom surface 30 of the holder 9. To secure the screw 11 against unintentional twisting of detachment, a cover 31, which embraces the screw head 30 in a form-locking fashion, is placed on the mounting pin 8. This form-locking fit can, e.g., be made via a set of teeth 32, shown in the figure, on the cover 31 and the screw head 20 in the form of catching elements. The cover 31 itself rests against the upper edge of the mounting pin 8, and engages via limbs 33, arranged thereon, with catches 34 in correspondingly arranged windows 35 of the mounting pin 8. The cover is thus likewise secured both against falling out and against being twisted, and also holds the screw 11 in this way.

The holder 9 is usually embodied as a plastic part, and it is also to be recommended to produce the remaining parts of the radiator mounting, such as the screw 11, compensating plate 12 and cover 31, from the same material. The material is light and insensitive to corrosion, and completely satisfies the requirements relating to strength in these cases of application.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Radiator mounting for a radiator in motor vehicles, comprising:
   a corresponding support fixed to the vehicle, said radiator resting against said support;
   a first bearing fixed to the vehicle, said first bearing having an opening;
   a second bearing fixed to the radiator and receiving the radiator elastically, the radiator being adjustably supported on the first bearing via said second bearing, the second bearing including a hollow mounting pin inserted within an opening of the first bearing, a mounting element received in said hollow mounting pin, and a compensating plate threadably held by said mounting element such that the position of the compensating plate is variable relative to the mounting element, the second bearing being separable from the first bearing such that the position of the compensating plate relative to the mounting element is unchanged when the radiator is removed from the support of the first bearing.

2. Radiator mounting according to claim 1, wherein the mounting element consists of a screw, and wherein the compensating plate is provided with a counter-thread and is held variably in position on the mounting element via a threaded connection.

3. Radiator mounting according to claim 1, wherein the mounting element has a head which is supported on the mounting pin.

4. Radiator mounting according to claim 2, wherein the mounting element has a head which is supported on the mounting pin.

5. Radiator mounting according to claim 3, wherein the head of the mounting element is connected form-lockingly to the mounting pin on a surface that is connected to the mounting pin.

6. Radiator mounting according to claim 4, wherein the head of the mounting element is connected form-lockingly to the mounting pin on a surface that is connected to the mounting pin.

7. Radiator mounting according to claim 3, wherein a surface of the head of the mounting element has a grip bar for manipulation.

8. Radiator mounting according to claim 5, wherein a surface of the head of the mounting element has a grip bar for manipulation.

9. Radiator mounting according to claim 6, wherein a surface of the head of the mounting element has a grip bar for manipulation.

10. Radiator mounting according to claim 1, wherein the mounting pin has a cover which seals the mounting pin at an open end of the cover and engages the mounting element.

11. Radiator mounting according to claim 10, wherein the cover is connected form-lockingly to the mounting element on a surface that is connected to the mounting element.

12. Radiator mounting according to claim 5, wherein the form-locking connection is an intermeshing set of teeth.

13. Radiator mounting according to claim 6, wherein the form-locking connection is an intermeshing set of teeth.

14. Radiator mounting according to claim 11, wherein the form-locking connection is a set of teeth.

* * * * *